(No Model.)

W. H. BARGER.
DEVICE FOR FEEDING SALT TO LIVE STOCK.

No. 376,360. Patented Jan. 10, 1888.

WITNESSES
G. S. Elliott
A. W. Johnson

William H. Barger
INVENTOR

Attorney

UNITED STATES PATENT OFFICE.

WILLIAM H. BARGER, OF BARGER'S SPRINGS, WEST VIRGINIA.

DEVICE FOR FEEDING SALT TO LIVE STOCK.

SPECIFICATION forming part of Letters Patent No. 376,360, dated January 10, 1888.

Application filed August 4, 1887. Serial No. 246,147. (No model.)

*To all whom it may concern:*

Be it known that I, WILLIAM H. BARGER, a citizen of the United States of America, residing at Barger's Springs, in the county of Summers and State of West Virginia, have invented certain new and useful Improvements in Devices for Feeding Salt to Live Stock; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in devices for feeding salt to live stock; and my invention consists in the construction and combination of the parts, as will be hereinafter fully set forth, and specifically pointed out in the claim.

Figure 1:
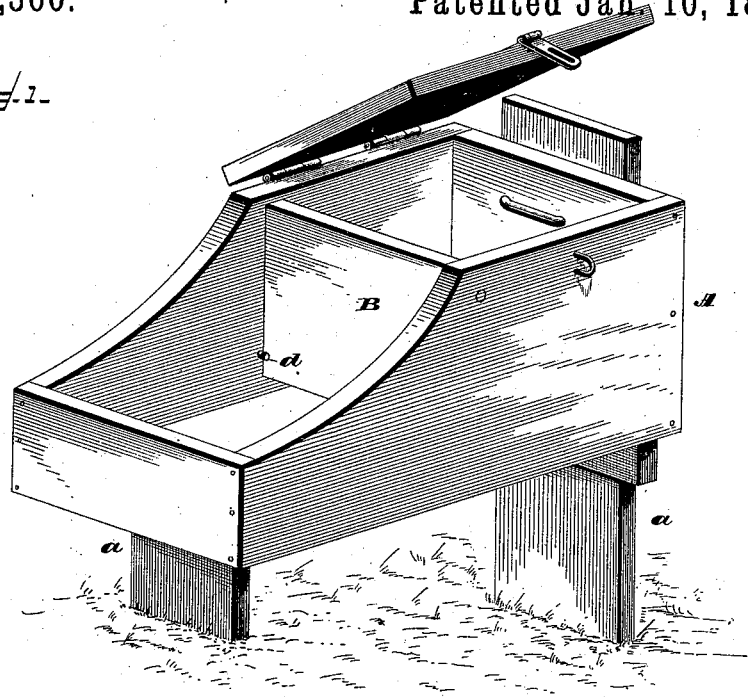
Figure 2:
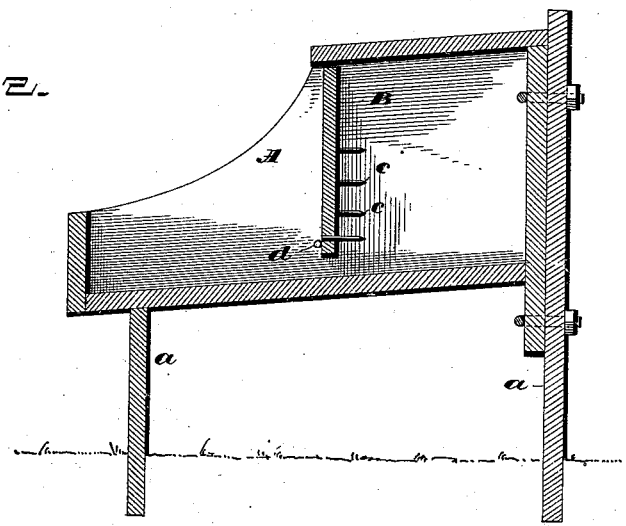

In the accompanying drawings, which illustrate my invention, Figure 1 is a perspective view of my improved device, and Fig. 2 is a sectional view.

A refers to a suitable trough or receptacle, which is mounted on posts or standards *a a*, so that the bottom thereof will be slightly inclined, the lower portion of the trough or receptacle being its front end. The side pieces of the front end of the trough are cut away, as shown, and the upper rear portion is provided with a hinged top which may be secured in a closed position by a hasp and staple. The trough or receptacle A is provided near the front edge of the top with a vertically-swinging gate, B, which is pivotally secured near its upper edge to the side pieces of said trough, and the inner side of this vertical swinging gate is provided with a series of projecting pins, *c c*. The outward movement of the lower end of the swinging gate is prevented by pins *d*, which project inwardly from the inner sides of the side pieces.

The device hereinbefore described is adapted to be placed in a field or barn-yard, and the portion beneath the hinged cover is adapted to be filled, or partially filled, with salt or other material which it is desired to feed to the cattle, and as the swinging gate does not extend to the bottom of the trough or receptacle a quantity of the material will pass under the swinging gate B to the lower portion of the trough. When the material or salt ceases to fall itself automatically to the lower portion of the trough, the live stock, by pressing against the swinging gate, will move the lower portion inwardly, so as to cause the pins to contact with the material, thereby loosening the same and permitting it to fall under the swinging gate.

The device hereinbefore described is extremely simple and effective, and will protect material under the cover from the weather, and animals will readily ascertain that by moving the swinging board a supply of salt or other material will be fed to them.

I claim—

The combination, substantially as before set forth, of a trough, a transverse partition pivoted at its upper end within the trough at a point intermediate its ends, a movable cover extending from one end of the trough just past the partition, pins projecting from the inner face of the partition, and stop-pins projecting inwardly from the sides of the trough to limit the outward swing of the partition.

In testimony whereof I affix my signature in presence of two witnesses.

WILLIAM H. BARGER.

Witnesses:
THOMAS G. MANN,
WALTER H. BOUDE.